United States Patent
Nakamaki et al.

(10) Patent No.: US 7,605,935 B2
(45) Date of Patent: Oct. 20, 2009

(54) PRINTER, PRINTER CONTROL METHOD, PROGRAM THEREFOR, AND RECORDING MEDIUM STORING THE PROGRAM

(75) Inventors: Motohiro Nakamaki, Nagano-Ken (JP); Hiroyuki Watanabe, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 1139 days.

(21) Appl. No.: 09/888,541

(22) Filed: Jun. 26, 2001

(65) Prior Publication Data

US 2002/0018229 A1  Feb. 14, 2002

(30) Foreign Application Priority Data

Jul. 26, 2000 (JP) ............... 2000-225180
May 28, 2001 (JP) ............... 2001-158815

(51) Int. Cl.
*G06F 15/00* (2006.01)
(52) U.S. Cl. ............ 358/1.15; 358/1.14; 358/1.16
(58) Field of Classification Search ........ 358/1.15, 358/1.14, 1.16
See application file for complete search history.

(56) References Cited

U.S. PATENT DOCUMENTS

| | | | | |
|---|---|---|---|---|
| 5,768,485 | A * | 6/1998 | Shimizu | 358/1.17 |
| 6,285,459 | B1 * | 9/2001 | Koakutsu et al. | 358/1.15 |
| 6,388,760 | B2 * | 5/2002 | Kadota et al. | 358/1.14 |
| 6,441,917 | B1 * | 8/2002 | Ikeda | 358/1.16 |
| 6,504,619 | B1 * | 1/2003 | Kageyama et al. | 358/1.14 |
| 6,567,179 | B1 * | 5/2003 | Sato et al. | 358/1.15 |
| 6,570,605 | B1 * | 5/2003 | Kashiwazaki | 347/264 |
| 6,600,569 | B1 * | 7/2003 | Osada et al. | 358/1.12 |
| 6,633,395 | B1 * | 10/2003 | Tuchitoi et al. | 358/1.14 |
| 6,804,016 | B2 * | 10/2004 | Hashimoto et al. | 358/1.13 |

FOREIGN PATENT DOCUMENTS

| | | |
|---|---|---|
| JP | 07-149001 | 6/1995 |
| JP | 09-114607 | 5/1997 |
| JP | 09/292959 | 11/1997 |
| JP | 11-149354 | 6/1999 |
| JP | 11-224084 | 8/1999 |

* cited by examiner

*Primary Examiner*—David K. Moore
*Assistant Examiner*—Mark R Milia
(74) *Attorney, Agent, or Firm*—Mattingly & Malur, P.C.

(57) ABSTRACT

A main task (44) pre-reads received data from a receiving buffer (22) before a read-out task (42) actually reads out the received data from the receiving buffer (22). If the main task (44) finds out a cancel command by the pre-reading, it transmits to a print management task (46) an instruction for canceling a print request data heretofore transmitted to the print management task 46. As a result, the print is cancelled. Thus needless printing can be minimized.

1 Claim, 8 Drawing Sheets

PRINTER, PRINTER CONTROL METHOD, PROGRAM THEREFOR, AND RECORDING MEDIUM STORING THE PROGRAM

BACKGROUND OF THE INVENTION

1. Field of the Invention

This invention relates to a printer, printer control method, program therefor, and recording medium storing the program, for example, based on the scheme of a printer configured to receive data from a computer through a single logic channel.

2. Description of the Related Background Art

Printers, in general, are configured to be supplied with print data to be printed and control data for controlling the printer. The print data and the control data supplied are stored in a receiving buffer of the printer.

In this case, if a computer and a printer are connected by an interface specification having only one logic channel, the print data and the control data are transmitted from the computer to the printer through the single logic channel, and they are stored in the receiving buffer in the order of arrival.

Typical control commands contained in such control data include a cancel command for canceling the print of print data heretofore transmitted, a status reply command requesting an answer about settings of the printer, and a paper size instruction command designating the paper size for the print data to be next printed.

The print data and the control data stored in the receiving buffer are sequentially read out, language-interpreted, and developed into bit image data in case of the print data, or processed in accordance with the control command in case of the control data.

Such a printer with an interface specification having a single logic channel could process data only in the order of transmission from the computer, and involved various inconveniences.

For example, when a cancel command is transmitted from the computer to the printer to cancel the print of the print data already transmitted from the computer to the printer, the printer could interpret that cancel command only after finishing interpretation of the preceding print command instructing the print of that print data. As a result, the printer often executes the needless print.

SUMMARY OF THE INVENTION

It is therefore an object of the invention to provide a printer that is configured to pre-read a received data stored in its receiving buffer, if necessary, such that it can interpret any control data prior to actual processing of the print data.

In order to accomplish the aforementioned and other objects, according to one aspect of the present invention, a printer comprising:

a receiving buffer in which received print data and control data are stored as received data in the order of receipt;

an executing section configured to read the received data from the receiving buffer in the order of storage, and develop the received data into an image if the received data is the print data and execute a control command if the received data is the control command of the control data; and a pre-processing section configured to pre-read the received data stored in the receiving buffer before the executing section reads them and, when a specific control command of the control data from the pre-read received data is found, the pre-processing section executing a procedure corresponding to the detected control command prior to the executing section.

According to another aspect of the present invention, a printer control method comprising the steps of:

storing received print data and received control data as received data in a receiving buffer in the order of receipt;

reading the received data out of the receiving buffer in the order of storage;

developing the print data into an image if the received data is the print data;

executing a control command if the received data is the control command of the control data;

pre-reading the received data stored in the receiving buffer prior to the reading them;

pre-executing procedure corresponding to a specific control command prior to the executing it if the specific control command of the control data is detected by the pre-reading.

According to a further aspect of the present invention, a program for controlling a printer, the program comprising the steps of:

storing received print data and received control data as received data in a receiving buffer in the order of receipt;

reading the received data out of the receiving buffer in the order of storage;

developing the print data into an image if the received data is the print data;

executing a control command if the received data is the control command of the control data;

pre-reading the received data stored in the receiving buffer prior to the reading them;

pre-executing procedure corresponding to a specific control command prior to the executing it if the specific control command of the control data is detected by the pre-reading.

According to a still further aspect of the present invention, a recording medium storing a program for controlling a printer, the program comprising the steps of:

storing received print data and received control data as received data in a receiving buffer in the order of receipt;

reading the received data out of the receiving buffer in the order of storage;

developing the print data into an image if the received data is the print data;

executing a control command if the received data is the control command of the control data;

pre-reading the received data stored in the receiving buffer prior to the reading them; pre-executing procedure corresponding to a specific control command prior to the executing it if the specific control command of the control data is detected by the pre-reading.

DETAILED DESCRIPTION OF THE PREFERRED EMBODIMENTS

First Embodiment

A printer according to a first embodiment of the invention is configured to first language-interpret received data in a receiving buffer and thereafter pre-read and language-interpret a predetermined amount of the received data stored in a main task, so that, if the pre-read received data is a cancel command, the printer does not print the data preceding the cancel command in the receiving buffer. This is explained below in greater detail.

Figure 1:
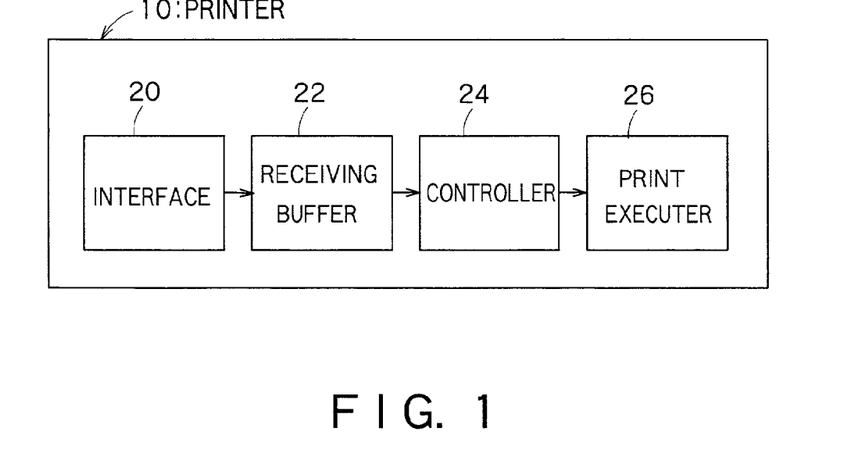
FIG. 1 is a block diagram that shows hardware configuration common to printers according to embodiments of the invention.

FIG. 1 shows a hardware configuration of the printer according to the first embodiment of the invention. As shown in FIG. 1, the printer 10 includes an interface 20, a receiving buffer 22, a controller 24 and a print executer 26. The controller 24 includes a central processing unit (CPU) according to the embodiment.

The interface 20 is supplied with print data and control data from a computer connected to the printer 10. The print data and the control data entering into the interface 20 are stored as received data in the receiving buffer 22 in the order of ingress. In the embodiment shown here, the interface 20 may be of any specification such as a parallel interface, a serial interface or the like. In this embodiment, however, the interface 20 and the computer are connected with a single logic channel. Therefore, the printer 10 receives the print data and the control data in the order of their transmission from the computer toward the printer 10, and stores them in the receiving buffer 22 in that order.

Among the received data stored in the receiving buffer 22, the print data undergoes language interpretation and bit image development in the controller 24, and it is subsequently transmitted to the print executer 26, which in turn executes the print by driving a printer engine. Among the received data stored in the receiving buffer 22, the control data undergoes language interpretation in the controller 24, and a processing based on the control command indicated by the control data is executed. That is, a necessary processing pursuant to the control command is executed.

Figure 2:
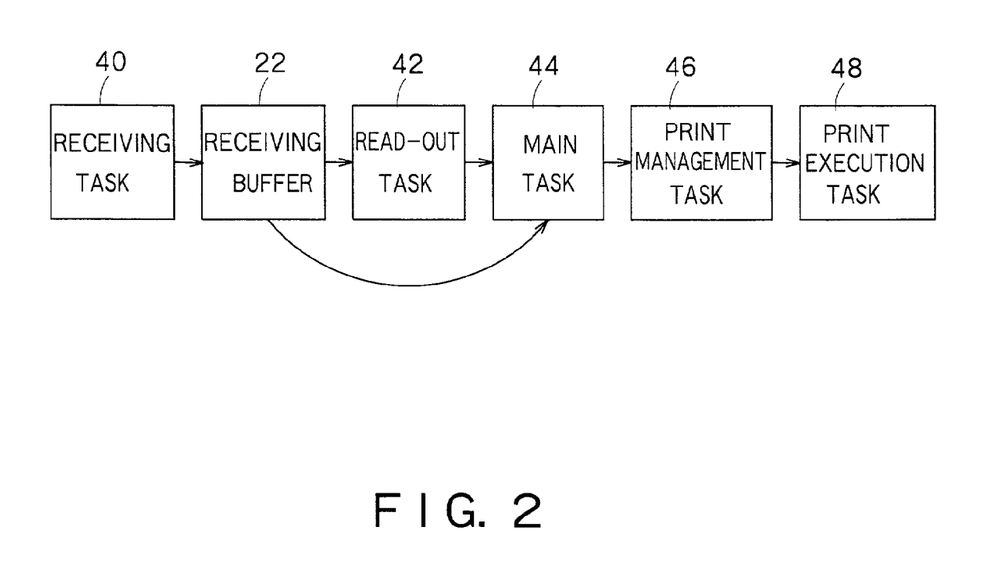
FIG. 2 is a diagram that shows some of tasks implemented in the printer according to a first embodiment of the invention.

Next referring to FIG. 2, tasks implemented in the printer 10 according to the embodiment are explained. Although FIG. 2 shows some tasks necessary for explaining this embodiment, the printer 10 implements other tasks as well.

As shown in FIG. 2, the printer 10 includes a receiving task 40, a read-out task 42, a main task 44, a print management task 46, and a print execution task 48. These tasks are executed by the central processing unit (CPU) being assigned in a predetermined order of priorities.

The receiving task 40 stores the print data and the control data, received at the interface 20, in the receiving buffer 22 as the received data in the order of receipt. The read-out task 42 reads the received data stored in the receiving buffer 22 in the order of storage, and delivers them to the main task 44. That is, the read-out task 42 reads the received data out of the receiving buffer 22 on the basis of a read-out pointer, and cumulatively counts up the read-out pointer each time.

The main task 44 performs language interpretation of received data, and if the received data is the print data, the main task 44 develops the data into a bit map image. Then, the main task 44 transmits the data developed into the bit map image as a print request data to the print management task 46. If the received data is the control data, the main task 44 executes the control command the control data indicates. For example, if the control command is a cancel command for canceling the print, then the main task 44 transmits an instruction to cancel the print request data already transmitted to the print management task 46.

In the embodiment shown here, the main task 44 pre-reads the received data stored in the receiving buffer 22. Then, the main task 44 determines whether there is any cancel command in the received data or not. However, even though the main task 44 pre-reads the received data from the receiving buffer 22, the read-out pointer indicating the position in the received buffer 22 to be read by the read-out task 42 does not change.

If the cancel command is found, the main task 44 transmits to the print management task 46 an instruction for canceling the print request data already transmitted to the print management task 46. In response to this cancel instruction, the print management task 46 cancels part of the print request data heretofore received but not yet printed. Further, the main task 44 transmits to the read-out task 42 an instruction for changing the read-out pointer such that the read is jumped to the position subsequent to the position where the cancel command was found in the receiving buffer 22.

The print management task 46 manages the received print request data by using a queue, and transmits to the print execution task 48 as soon as the print execution task 48 finishes a preceding print processing. In response to the print request data, the print execution task 48 drives the printer engine in the print executer 26 to print the material on print paper. Upon completion of the print, the print management task 46 releases the region of the queue having stored the print request data.

Figure 3:
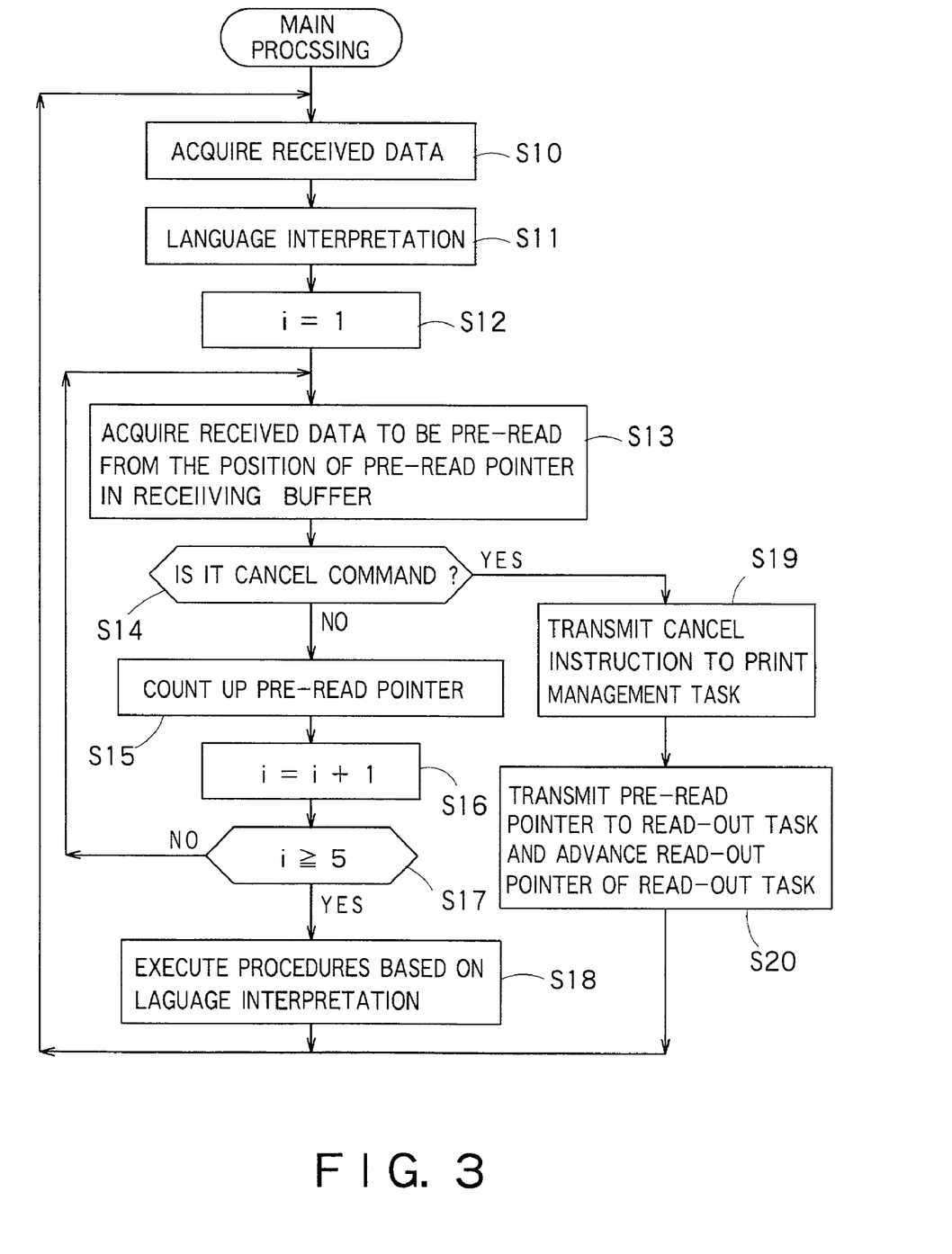
FIG. 3 is a flowchart for explaining a main processing executed by a main task in the first embodiment of the invention.

Next referring to FIG. 3, processing by the main task 44 is explained in detail. FIG. 3 is a flowchart that illustrates the main processing by the main task 44.

As shown in FIG. 3, the main task 44 first acquires received data from the read-out task 42 (step S10). Subsequently, it performs the language interpretation of the received data (step S11).

Subsequent steps S12 through step S17, step S19 and step S20 correspond to the pre-read processing in the instant embodiment. That is, the main task 44 sets the variable i at 1 for counting the occurrence of loops (step S12). After that, the main task 44 reads and acquires the received data to be pre-read from the position of the read-out pointer in the receiving buffer 22 (step S13).

After that, the main task 44 determined whether the received data to be pre-read is the cancel command or not (step S14). If it is not the cancel command (step S14: No), the task counts up such that the read-out pointer points the next command (step S15). For example, since the cancel command is made up of one byte, the read-out pointer is counted up by one byte. However, in case the main task 44 pre-reads a command other than cancel commands, the amount counted up is not always one byte. For example, since a character print grade selection command is made up of three bytes, it results in counting up the read-out pointer by three bytes. For a command of which the number of bytes is undefined and therefore which includes a region designating the size therein, the region indicating the size of the command is interpreted, and a necessary amount is counted up. Changing the count-up amount in response to the command for searched by the pre-read is for the purpose of enhancing the pre-read efficiency. The pre-read pointer, however, may be counted up in the unit of one byte instead of obeying the pre-read command.

The main task 44 next counts up the variable i for counting the number of loops one by one (step S16). Subsequently, it determines whether the variable i is five or more, or less than five (step S17). That is, it determines whether the number of loops is five or more, or less than five. Although the embodiment shown here is configured to pre-read the received data five times, the number of loops need not be five. Also, the number of loops can be dynamically changed depending on the amount of the received data stored in the receiving buffer 22, amount of the print request data the print management task 46 stores in the queue, or the like. For example, the number of pre-read loops may be increased to ten when the amount of data stored in the receiving buffer 22 or in the queue of the print management task 46 exceeds a predetermined value. On the contrary, the number of pre-read loops may be reduced to three when the amount of data stored in the receiving buffer 22 or in the queue of the print management task 46 decreases below a predetermined value.

In the step S17, occurrences of the pre-read do not exceed five times (step S17: No), the procedures from step S13 are repeated.

On the other hand, if occurrences of the pre-read exceed five times (step S17: Yes), actual procedures are taken in accordance with the result of the language interpretation performed instep S11 already explained (step S18). That is, if the result of the language interpretation of the received data shows that the received data is a print data, a bit map image is developed based on the content of the print data, and it is transmitted as a print request data to the print management task 46. If the result of the language interpretation of the received data shows that the received data is a control data, the content of the control command indicated by the control data is executed. Then, the flow returns to the step S10 already explained.

In contrast, in the step S14, the received data which are pre-read is determined to be a cancel command (step S14: Yes), the main task 44 transmits to the print management task 46 a command for canceling the print request data already transmitted (step S19). Subsequently, the main task 44 transmits to the read-out task 42 the pre-read pointer at that time such that the read-out pointer indicating the read-out position from the receiving buffer 22 in the read-out task 42 is advanced to the position next to the pre-read pointer (step S20). In this case, the position of the pre-read pointer is continuously used without being initialized every time of the pre-read procedure. As a result, it is prevented that the same received data stored in the receiving buffer 22 is pre-read twice or more. Then, the flow returns to the procedure of the step S10 already explained.

As explained above, with the printer 10 according to the instant embodiment, since the main task 44 pre-reads received data stored in the receiving buffer 22 as the occasion demands, and if it finds the cancel command, it cancels the print data the printer 10 has received prior to the cancel command. Therefore, it is possible to prevent that the printer 10 continues the needless print.

Second Embodiment

The second embodiment of the invention features the pre-read procedure which is taken out from the main task in the first embodiment to be as an independent task. This is explained below in greater detail. The hardware configuration of the printer according to the second embodiment is the same as that of FIG. 1.

Figure 4:
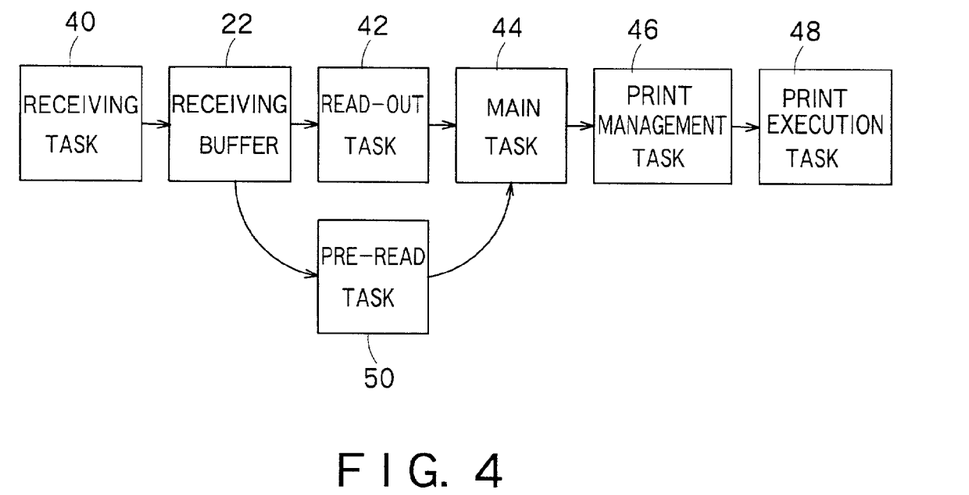
FIG. 4 is a diagram that shows some of tasks implemented in the printer according to a second embodiment of the invention.

First referring to FIG. 4, the task configuration of the printer 10 according to this embodiment is explained. As shown in FIG. 4, the printer 10 according to the instant embodiment includes a pre-read task 50 in addition to those of FIG. 2 already explained.

The pre-read task 50 is a task to sequentially pre-read the received data from the receiving buffer 22 on the basis of the pre-read pointer and search for any cancel command. If the cancel command is found, the pre-read task 50 transmits to the main task 44 a cancel message for canceling the print based on the received data received prior to the receipt of the cancel command.

The main task 44 does not include the pre-read procedures in FIG. 3 already explained, and directly undertakes necessary procedures for canceling the print in accordance with the received cancel message.

Figure 5:
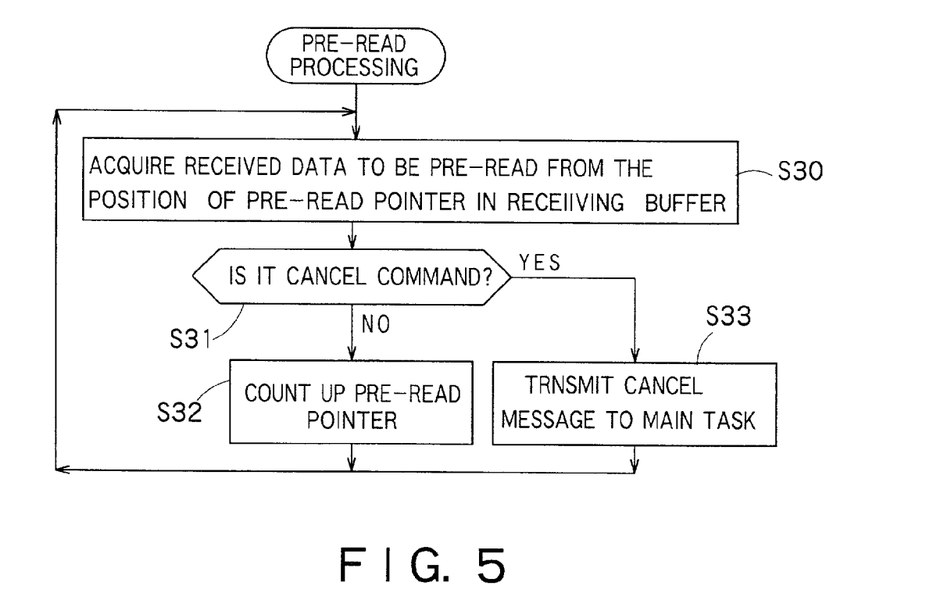
FIG. 5 is a flowchart for explaining a pre-read processing executed by a pre-read task in a second embodiment of the invention.

Next referring to FIG. 5, the pre-read procedures by the pre-read task 50 are explained. FIG. 5 is a flowchart that illustrates the contents of the pre-read procedures by the pre-read task 50.

As shown in FIG. 5, the pre-read task 50 first acquires the pre-read received data in the receiving buffer 22 from the position indicated by the pre-read pointer (step S30). The pre-read task 50 next determines whether the acquired received data is the cancel command or not (step S31).

If the received data is not a cancel command (S31: No), then the pre-read task 50 counts up the pre-read pointer (step S32). In the same manner as the first embodiment, since the cancel command is here again made up of one byte, the pre-read pointer is counted up by one byte. It is also the same as the first embodiment that the count-up value is not limited to one byte. After the procedure of the step S32, the flow returns to the step S30 already explained.

On the other hand, the procedure of step S31 shows that the received data is the cancel command (step S31: Yes), then the pre-read task 50 transmits a cancel message to the main task 44 (step S33), and the flow returns to the step S30 already explained.

Figure 6:
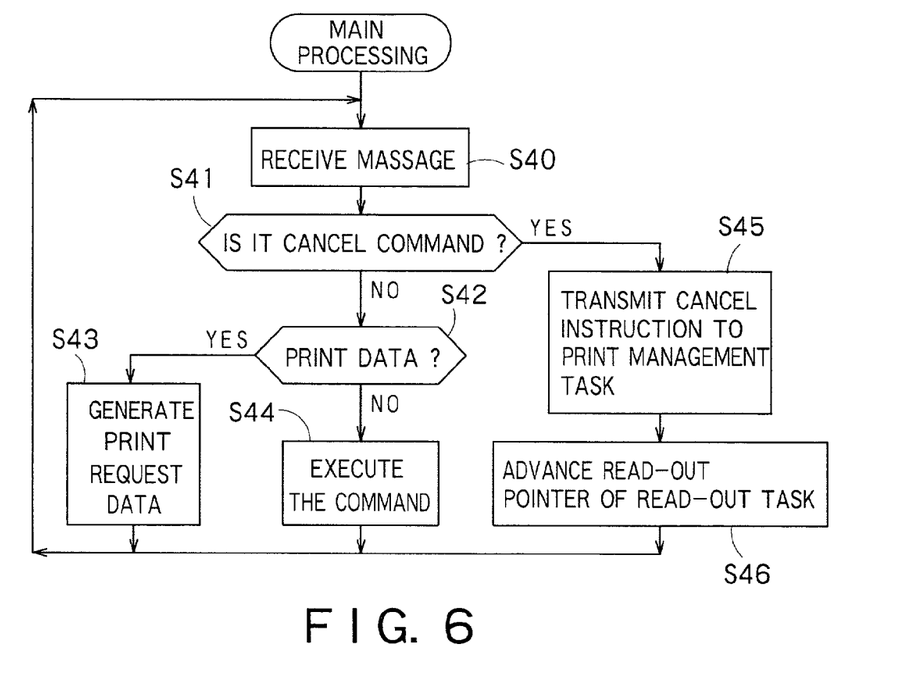
FIG. 6 is a flowchart for explaining a main processing executed by a main task in the second embodiment of the invention.

Next referring to FIG. 6, the main processing by the main task 44 is explained. FIG. 6 is a flowchart that illustrates the contents of the main processing by the main task 44.

As shown in FIG. 6, the main task 44 receives some message from the read-out task 42 and the pre-read task 50 (step S40). Subsequently, the main task 44 determines whether the received message is the cancel command or not (step S41).

If the received message is not the cancel command (step S41: No), then the main task 44 determines whether the received message is the print data or not (step S42). If the received message is the print data (step S42: Yes), the main task 44 generates the print request data based on the print data (step S43). That is, main task 44 performs the language interpretation of the print data, develops a bit map image based on the interpretation, generates the print request data, and transmits them to the print management task 46. Then the flow returns to step S40 already explained.

On the other hand, in step S42, if the main task 44 determines that the received message is not the print data (step 42: No), namely, if the main task 44 determines that the received message is the control data, the main task 44 performs the control command contained in the control data (step 44). Then the flow returns to step 40 already explained.

On the other hand, in step 41, if the main task 44 determined that the received message is the cancel command (step S41: Yes), it transmits to the print management task 46 the instruction for canceling the print request data already transmitted (step S45). Subsequently, the main task 44 causes the read-out pointer pointing the read-out position from the receiving buffer 22 in the read-out task 42 to advance to the position next to the pre-read pointer (step S46). In this case, the position of the pre-read pointer of the pre-read task 50 may be directly transmitted from the pre-read task 50 to the read-out task 42, or may be transmitted to the read-out task 42 via the main task 44. After that, the flow returns to the procedure of the step S40 already explained.

Figure 7:
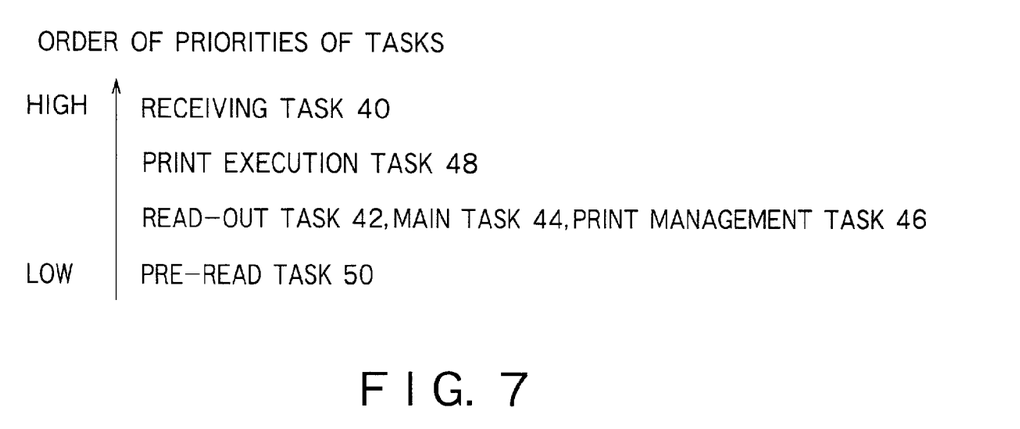
FIG. 7 is a diagram that shows a priority rule of tasks in each embodiment of the invention.

FIG. 7 is a diagram that explains the order of priorities of respective tasks in the printer 10. In FIG. 7, the higher the priority of a task, the higher the priority of assignment of the central processing unit (CPU) contained in the controller 24 to the task.

As shown in FIG. 7, the priority of the receiving task 40 is the highest among others, and the priority of the print execution task 48 is the next. Those having the next highest priorities are the read-out task 42, the main task 44 and the print management task 46. Priorities of these read-out task 42, main task 44 and print management task 46 are equivalent in the embodiments. The priority of the pre-read task 50 is the lowest because the processing of the pre-read task 50 is not indispensable for the print by the printer 10 and may be executed in any appropriate time where the load to the central processing unit (CPU) contained in the controller 24 is light. Since the priority of the pre-read task 50 is set low in this manner, it is possible that the received data not through the pre-read procedure is processed earlier by the read-out task 42 and the main task 44, which are normal procedures. In this case, the pre-read task 50 may pre-read the data forward from the read-out position from the receiving buffer 22 in the read-out task 42, for which normal procedures have already been finished.

As explained above, with the printer 10 according to the instant embodiment, the pre-read task 50 pre-reads the received data stored in the receiving buffer 22 as the occasion demands, and if any cancel command is found, it gives a notice to the main task 44 to cancel the print data already received by the printer 10 prior to the cancel command. Therefore, it is prevented that the printer 10 continues the needless print.

Third Embodiment

The third embodiment of the invention is modified from the second embodiment such that the pre-read task 50 transmits the cancel message, if the cancel command is found, to the read-out task 42 instead of the main task 44. This is explained below in greater detail. Here again, the hardware configuration of the printer is the same as that shown in FIG. 1. Also the order of priorities for respective tasks is the same as that of the second embodiment already explained.

Figure 8:
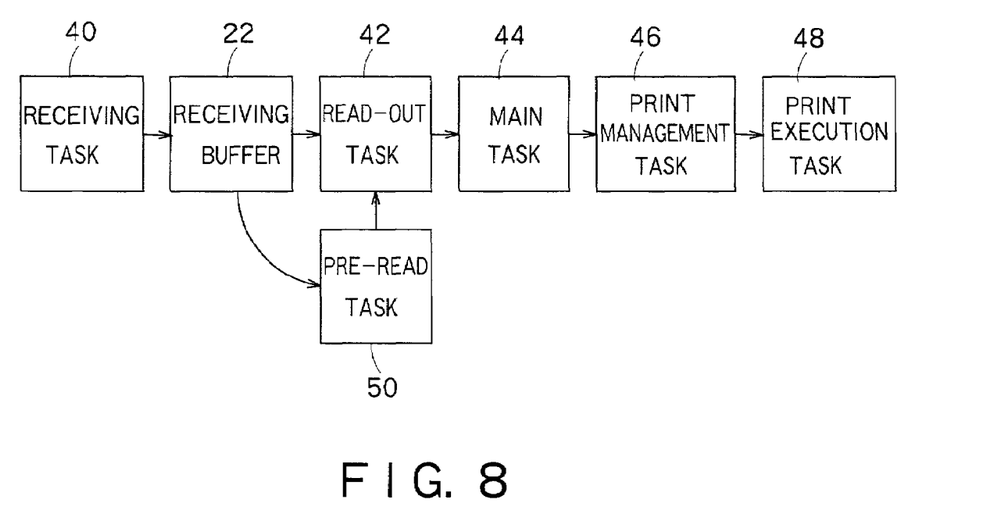
FIG. 8 is a diagram that shows some of tasks implemented in the printer according to a third embodiment of the invention.

First referring to FIG. 8, the task configuration of the printer 10 according to the instant embodiment is explained. As shown in FIG. 8, the printer 10 shown here is modified from the configuration of FIG. 4 to transmit a cancel message from the pre-read task 50 to the read-out task 42.

That is, based on the pre-read pointer, the pre-read task 50 sequentially pre-reads the received data from the receiving buffer 22 and searches for any cancel command. If the pre-read task 50 finds the cancel command, it transmits the cancel message to the read-out task 42 to cancel the print based on the received data received prior to the receipt of the cancel command.

Upon receipt of the cancel message, the read-out task 42 transmits the cancel message to the main task 44 as if the read-out task 42 have read out the cancel command from the receiving buffer 22 as its normal routine manner. Further, the read-out task 42 moves the read-out pointer for reading the actual received data forward to the position next to the pre-read pointer such that the received data is next read out from the position next to the pre-read pointer in the receiving buffer 22.

Figure 9:
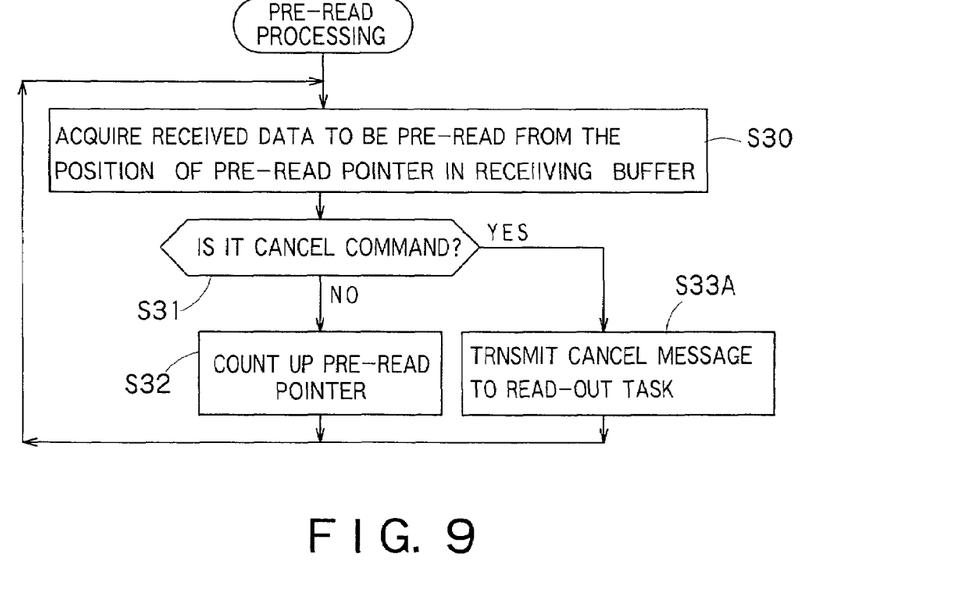
FIG. 9 is a flowchart for explaining a pre-read processing by a pre-read task in the third embodiment of the invention.

Next referring to FIG. 9, pre-read procedures by the pre-read task 50 are explained. FIG. 9 is a flowchart that explains the contents of the pre-read procedures by the pre-read task 50.

Here is made an explanation only about portions different from the pre-read procedures shown in FIG. 5 as the second embodiment. As shown in FIG. 9, when the pre-read task 50 determines that the received data acquired in step S31 is the cancel command (step S31: Yes), it transmits the cancel message to the read-out task 42 (step S33A). In the other respects, the third embodiment is the same as the second embodiment.

Figure 10:
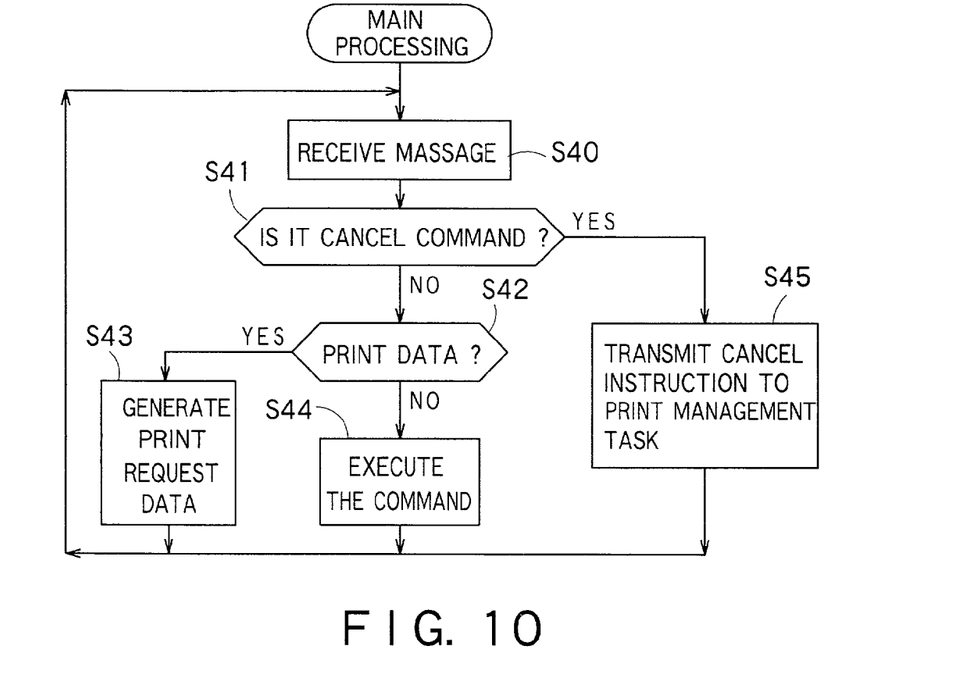
FIG. 10 is a flowchart for explaining a main processing by a main task in the third embodiment of the invention.

Next referring to FIG. 10, main procedures by the main task 44 are explained. FIG. 10 is a flowchart that explains the contents of the main procedures by the main task 44.

Here is made an explanation only about portions different from the main procedures shown in FIG. 6 as the second embodiment. As shown in FIG. 10, in step S45, the main task 44 transmits to the print management task 46 the instruction for canceling the print request data heretofore transmitted, and the flow returns to the procedure of step S40. That is, since the read-out pointer of the read-out task 42 is moved forth by the read-out task 42 itself, the procedure in step S46 of the second embodiment is not required here. In the other respects, the third embodiment is the same as the second embodiment.

As explained above, with the printer 10 according to the instant embodiment, the pre-read task 50 adequately pre-reads the received data stored in the receiving buffer 22, and if any cancel command is found therein, the pre-read task 50 gives a notice to the read-out task 42, so that the read-out task 42 transmits the cancel message to the main task 44. Therefore, it is possible to cancel the print data received by the printer 10 prior to the cancel command and to prevent the printer 10 from undesirably continuing the needless print.

Fourth Embodiment

The fourth embodiment of the invention is based on the first embodiment already explained, and the printer detects a paper size designation command from the received data pre-read from the receiving buffer 22, and then determines whether or not it is possible to print the received data on a sheet of paper of the size designated by the paper size designation command. And if the printing is currently impossible, the printer gives the user a notice of that. These procedures are explained below in greater detail. Here again, the hardware configuration of the printer 10 is the same as that shown in FIG. 1.

Figure 11:
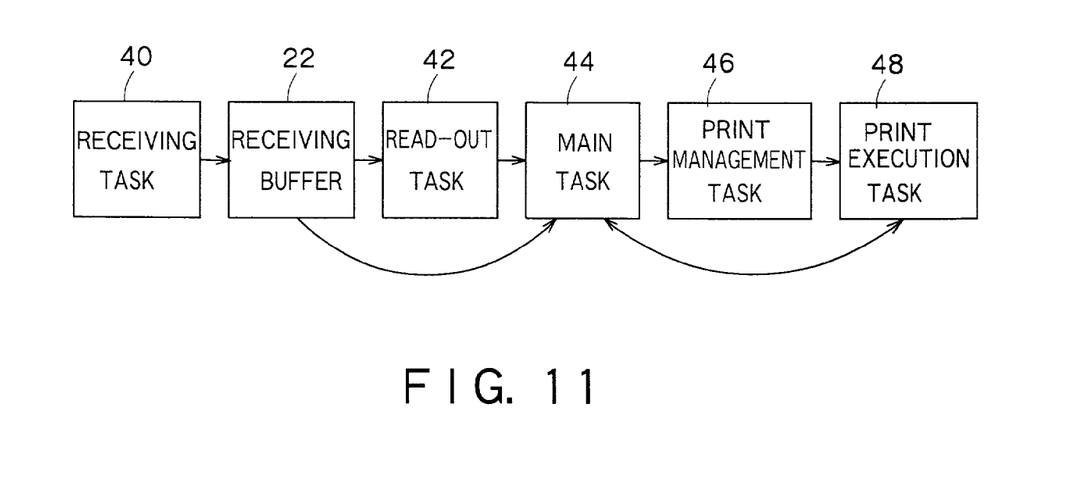
FIG. 11 is a diagram that shows some of tasks implemented in the printer according to a fourth embodiment of the invention.

First referring to FIG. 11, the task configuration implemented in the printer 10 according to the instant embodiment is explained. As shown in FIG. 11, tasks implemented in the printer 10 shown here are the same as those shown in FIG. 2 as the first embodiment except that the main task 44 makes an inquiry to the print execution task 48. That is, the main task 44 asks the print execution task 48 which sizes of paper trays the printer 10 has, and/or whether a particular paper tray contains sheets of paper, for example. The print execution task 48 returns its answers to the main task 44. In the other respects, the fourth embodiment is the same as the first embodiment.

Figure 12:
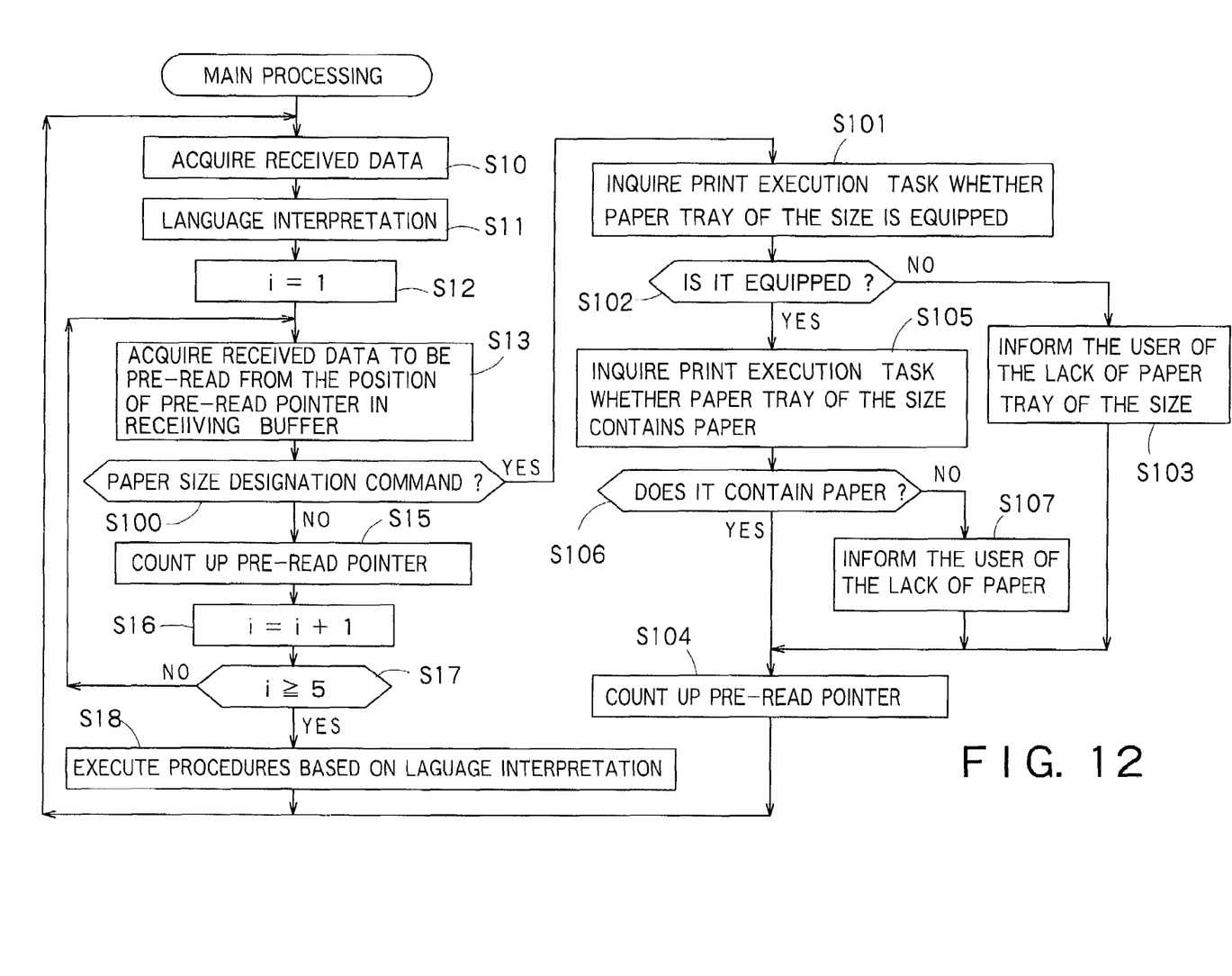
FIG. 12 is a flowchart for explaining a main processing by a main task in the fourth embodiment of the invention.

Next referring to FIG. 12, procedures of the main task 44 in the instant embodiment are explained in greater detail. FIG. 12 is a diagram corresponding to FIG. 3 showing the first embodiment already explained, and here is made an explanation only about portions different from the first embodiment.

The main task 44, having acquired the received data to be pre-read in step S13, determines whether this is a paper size designation command or not (step S100). The paper size designation command is a control command transmitted prior to transmission of the actual print data from the computer to designate a particular size of paper for printing the print data received later.

If it is the paper size designation command (step S100: Yes), the main task 44 inquires the print execution task 48 whether or not the printer 10 has a paper tray of the size designated by the paper size designation command (step S101). If a response to the query expresses that the printer 10 is not equipped with a tray of the designated size (step S102: No), the main task 44 gives the user a notice that there is not paper tray of the designated size in this printer 10 (step S103). After that, it counts up the pre-read pointer (step S104), and the flow returns to the leading step S10. Here again, similarly to the first embodiment, the count-up value of the pre-read pointer can be selected as desired.

On the other hand, in step S102, if the answer from the print execution task 48 expresses that the printer 10 is furnished with a tray of the designated size (step S102: Yes), the main task 44 inquires the print execution task 48 whether or not the paper tray of the designated size contains a sheet of paper (step S105). If the answer declares that the paper tray of the designated size in the printer 10 contains no sheet of paper (step S106: No), the main task 44 gives the user a notice that no paper is contained in the paper tray (step S107). Then, the pre-read pointer is counted up (step S104), and the flow returns to step S10.

In contrast, in step S106, if the answer from the print execution task 48 tells that the paper tray of the designated size contains a sheet of paper (step S106: Yes), since it can be expected that the paper size designation command will be properly executed, the main task 44 merely counts up the pre-read pointer (step S104) and then allows the flow to return to step S10.

As explained above, with the printer 10 according to the instant embodiment, the paper size designation command to be executed later is found by pre-reading the receiving buffer 22, and if the printer 10 does not have the paper tray of a particular size designated by the paper size designation command, the fact is notified to the user beforehand. Therefore, while the printer 10 is performing a printing processing of another print data, the user can know that his/her desired print to be next executed will be impossible under the current condition because of the lack of a paper tray of the designated paper size. Then, the user can cancel the print itself, and/or if the printer 10 is equipped with two or more paper trays, the user can change the size of a paper tray which is not using currently into the designated size.

In addition, with the printer 10 according to the instant embodiment, a paper size designation command to be executed later is found by pre-reading the receiving buffer 22, and if a paper tray of a particular size designated by the paper size designation command contains no sheet of paper, the fact is previously notified to the user. Therefore, while the printer 10 executing a printing processing of another print data, the user can know that his/her desired print to be next executed will be impossible under the current condition because of the lack of a sheet of paper of the designated paper size. Then the user can replenish one or more sheets of paper in the paper tray beforehand.

Such situations will often occur when the printer 10 is commonly used as a network printer by a plurality of users. With the printer according to the instant embodiment, however, since a user can deal with the error of his/her own print data before the printer 10 finishes the current print of another user's print data, convenience for users is enhanced. The embodiment shown here can be also realized in combination with the first embodiment. That is, the main task 44 may pre-read the received data from the receiving buffer 22 to find both a cancel command and a paper size designation command and to execute the above-mentioned procedures, respectively.

Fifth Embodiment

The fifth embodiment of the invention is a version incorporating the fourth embodiment into the second embodiment. That is, in the second embodiment, the pre-read task pre-reads the received data from the receiving buffer 22 to detect the paper size designation command, and then the pre-read task determines whether or not the print on a sheet of paper of the size designated by the paper size designation command is possible, and if not, inform the user of the fact. These procedures are explained below in greater detail. The hardware configuration of the printer 10 according to the fifth embodiment is the same as that shown in FIG. 1.

Figure 13:
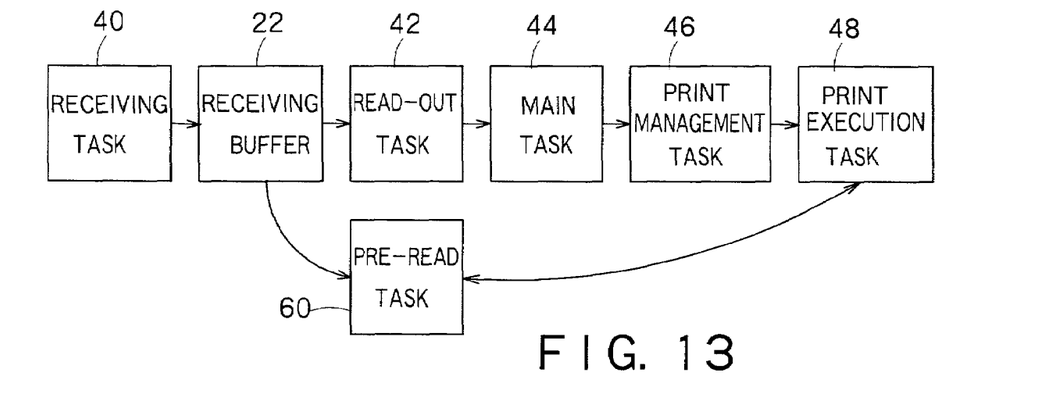
FIG. 13 is a diagram that shows some of tasks implemented in the printer according to a fifth embodiment of the invention.

First referring to FIG. 13, the task configuration implemented in the printer 10 according to the instant embodiment is explained. As shown in FIG. 13, tasks implemented in the printer shown here are the same as those shown in FIG. 4 as the second embodiment except that the pre-read task 60 makes inquiries to the print execution task 48. That is, the pre-read task 60 asks the print execution task 48 which sizes of paper trays the printer 10 has, whether a paper tray contains a sheet of paper, and so forth. The print execution task 48 returns answers to the pre-read task 60. In addition, in the instant embodiment, even when a paper size designation command that cannot be executed is found by pre-reading the receiving buffer 22, since the current printing processing is not affected at that point of time, the pre-read task 60 does not transmit any message to the main task 44. In the other respects, the fifth embodiment is the same as the second embodiment already explained. Also, the order of priorities of the tasks in the instant embodiment is the same as the second embodiment.

Figure 14:
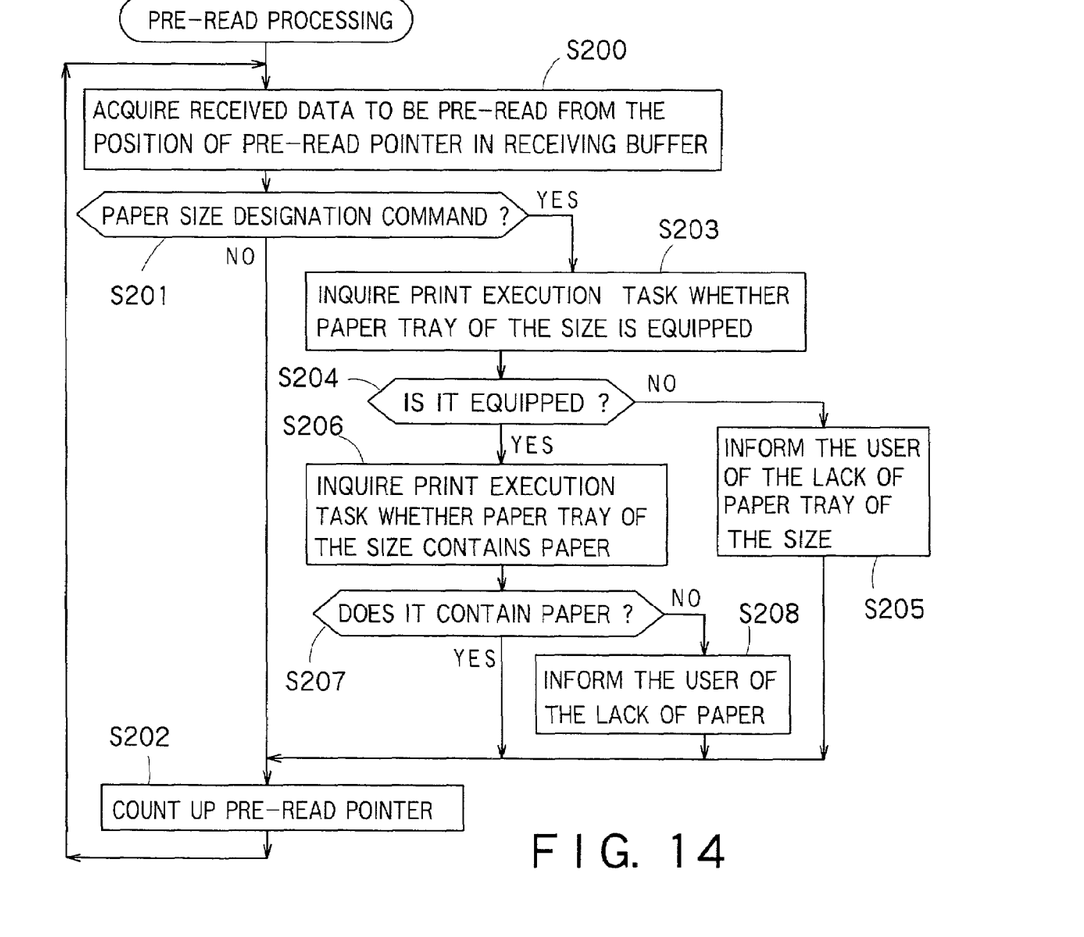
FIG. 14 is a flowchart for explaining a pre-read processing by a pre-read task in the fifth embodiment of the invention.

Next referring to FIG. 14, pre-read procedures by the pre-read task 60 according to the instant embodiment are explained below in greater detail. FIG. 14 is a flowchart that explains the contents of the pre-read procedures of the pre-read task 60.

As shown in FIG. 14, the pre-read task 60 first acquires the received data to be pre-read from the receiving buffer 22 at the position indicated by the pre-read pointer (step S200). The pre-read task 60 next determines whether the acquired received data is the paper size designation command or not (step S201).

If the received data is not the paper size designation command (step S201: No), the pre-read task 60 count up the pre-read pointer (step S202). Here again, similarly to the second embodiment, the count-up value of the pre-read pointer can be selected as desired. After completion of the procedure of this step S202, the flow returns to step S200 already explained.

On the other hand, in step S201, if the received data is a paper size designation command (step S201: Yes), the pre-read task 60 inquiries the print execution task 48 whether the printer 10 has a paper tray of the size designated by the paper size designation command (step S203). If the answer to the inquiry tells that the printer 10 has no paper tray of the designated size (step S204: No), the pre-read task 60 informs the user that the printer 10 has no paper tray of the designated size (step S205). Then it counts up the pre-read pointer (step S202), and the flow returns to the leading step S200.

On the other hand, in step S204, if the pre-read task 60 receives the answer from the print execution task 48 stating that the printer 10 has the paper tray of the designated size (step S204: Yes), the pre-read task 60 inquiries the print execution task 48 whether the paper tray of the designated size contains a sheet of paper or not (step S206). If the pre-read task 60 receives an answer to the inquiry, stating that the paper tray of the designated size of the printer 10 does not contain any sheet of paper (step S207: No), the pre-read task 60 notifies the user about the lack of paper (step S208). Then, the pre-read task 60 counts up the pre-read pointer (step S202), and the flow returns to step S200.

In contrast, in step S207, if the pre-read task 60 receives an answer from the print execution task 48, stating that the paper tray of the designated size contains a sheet of paper (step S207: Yes), since it can be expected that the paper size designation command will be properly executed, only through counting up the pre-read pointer (step S202), the flow returns to step S200.

As explained above, with the printer 10 according to the instant embodiment, a paper size designation command to be executed later is detected by pre-reading, and if the printer 10 has no paper tray of the size designated by the paper size designation command, the fact is notified to the user beforehand. In addition, the paper size designation command to be executed later is detected by pre-reading, and if the paper tray of the size designated by the paper size designation command contains no sheet of paper, the fact is notified to the user beforehand. Therefore, the user can appropriately deal with the error of its own print data before the processing of another user's print data is completed, and convenience for users can be enhanced.

The embodiment shown here can be also realized in combination with the second embodiment. That is, the pre-read task 60 may be configured to pre-read the received data from the receiving buffer 22 to find out both the cancel command and the paper size designation command and to execute the above-mentioned procedures, respectively.

The invention is not limited to the above-explained embodiments, but it can be modified in various modes. For example, although those embodiments are explained as finding a cancel command and/or a paper size designation command as control commands by pre-reading to take necessary procedures therefor, they can be additionally implemented with the function of finding other kinds of control commands and taking necessary procedures therefor. For example, it will be possible to find out a status reply as the control command by pre-reading and execute it prior to dealing with the print data. In this case, however, it will be necessary to store a no-operation command, which section doing no processing, at the location in the received buffer 22 where the status reply has been stored.

Concerning the processing explained in the foregoing embodiment, the programs for executing the processing can be stored on and distributed in the form of a recording medium, for example, a flexible disk, a CD-ROM (compact disc read only memory), a ROM, a memory card, etc. In this case, once the printer 10 reads such programs from the recording medium, stores them in the DRAM of the printer 10, and executes the programs, so that the embodiment explained above can be realized.

In many cases, the printer 10 has other programs such as an operating system, other application programs, and so on. In these cases, in order to efficiently use the other programs of the printer 10, instructions may be recorded on the recording medium for calling, from the other programs of the printer 10, one or more programs that can realize processing equivalent to the processing of the foregoing embodiment.

Moreover, these programs may also be distributed as a carrier wave through a network, instead of the recording medium. The programs, transmitted as the carrier wave through the network, can be stored in the printer 10 and executed to realize the foregoing embodiment.

In some cases, the programs are encrypted and/or compressed when they are recorded on a recording medium or transmitted as the carrier wave through the network. In these cases, having acquired the programs from the recording medium or the carrier wave, the printer 10 has to decode and/or expand the programs before executing them.

What is claimed is:

1. A printer comprising:
   a receiving buffer in which received print data and control data are stored therein without analysis as received data in the order of receipt;
   an executing section configured to read the received data from the receiving buffer in the order of storage, and develop the received data into an image if the received data is the print data and execute a control command if the received data is a control command of the control data; and
   a pre-processing section configured to pre-read the received data stored in the receiving buffer before the executing section reads the received data and, when a specific control command of the control data from the pre-read received data is found, the pre-processing section executes a procedure corresponding to the detected control command prior to the executing section;
   wherein the specific control command is a cancel command for canceling the print based on the print data received prior to the specific control command, and when the pre-processing section finds the cancel command, the pre-processing section executes the cancel command prior to the executing section; and
   further comprising a read-out position changing section which functions, when the pre-processing section has executed the cancel command, such that the position in the receiving buffer for the executing section to read the received data is jumped to the position next to the cancel command.

* * * * *